Dec. 20, 1938.  L. A. CARTER  2,140,983
LUBRICATING DEVICE
Filed May 18, 1935
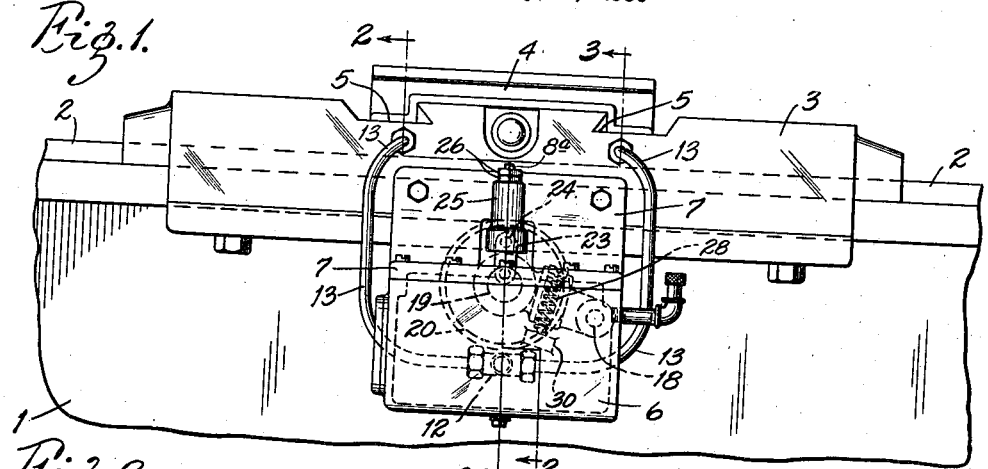
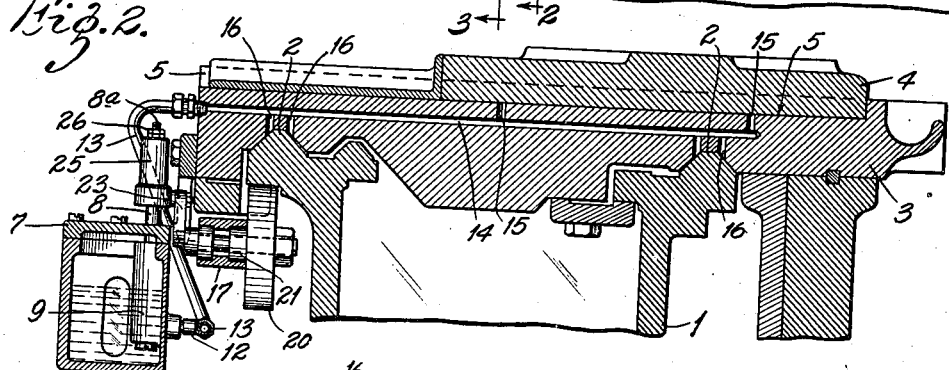
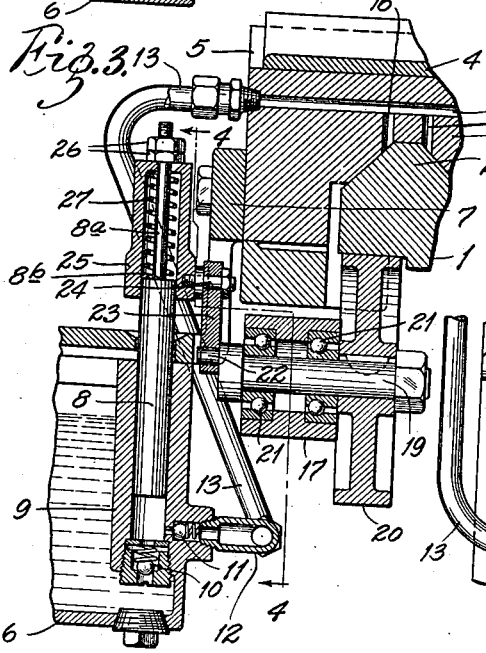
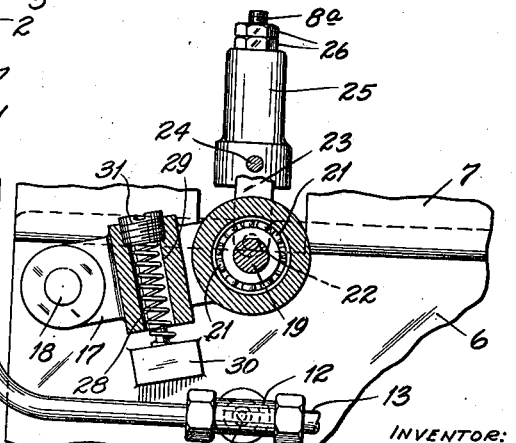
INVENTOR:
Lionel A. Carter
by Parrott Carrot Knively
HIS ATTORNEYS.

Patented Dec. 20, 1938

2,140,983

UNITED STATES PATENT OFFICE 2,140,983

LUBRICATING DEVICE

Lionel A. Carter, Webster Groves, Mo.

Application May 18, 1935, Serial No. 22,149

8 Claims. (Cl. 184—6)

This invention relates to the lubrication of the ways of lathes, planers or the like. The principal object of the present invention is to devise means operated by the movement of the carriage for assuring positive lubrication of the ways along which the carriage and cross-slide move, respectively. Other objects are to prevent building up of excessive lubricant pressure and to provide for simplicity and cheapness of construction and compactness of design. The invention consists in the lubricating device and in the combinations and arrangements of parts hereinafter described and claimed.

In the accompanying drawing, which forms part of this specification and wherein like symbols refer to like parts wherever they occur, Fig. 1 is a fragmentary rear elevation of the bed, carriage and cross-slide of a lathe provided with a lubricating device embodying my invention, Fig. 2 is a vertical cross-section on the line 2—2 in Fig. 1, Fig. 3 is an enlarged vertical cross-section on the line 3—3 in Fig. 1; and Fig. 4 is a vertical section on the line 4—4 in Fig. 3.

In the accompanying drawing, my invention is shown in connection with a lathe comprising a bed 1, provided with longitudinal ways or guides 2, along which a carriage 3 moves, and a member or cross-slide 4 movable transversely of the longitudinal carriage ways on ways 5 provided therefor on said carriage. According to the present invention, the ways upon which the carriage 3 and cross-slide 4 move are lubricated by means of a device comprising an oil reservoir or tank 6 fixed to one flange of an angle-shaped bracket 7 whose other flange is bolted flatwise to the rear face of said carriage. The oil is delivered from the tank 6 to the ways 2 and 5, preferably by means of a pump comprising a plunger or piston 8 that reciprocates in an upright cylinder 9 located in said tank and is provided with suitable spring-pressed, inlet and discharge valves 10 and 11, respectively. Oil from the discharge valve 11 is forced through a suitable T-fitting 12 and thence upwardly through pipes 13 into passageways 14 formed in the carriage 3 beneath the cross-slide ways 5 thereon. As shown in the drawing, oil is supplied to the ways 5 for the cross-slide 4 through upwardly extending branches 15 of the passageways 14; and oil is supplied to the ways 2 for the carriage through downwardly extending branches 16 of said passageways.

A connection is provided between the carriage and the pump for actuating said pump whenever said carriage is moved. As shown in the drawing, said connection comprises an arm 17 pivoted on a stud 18 for vertical swinging movement on the front wall of the oil tank 6 and provided at its free end with a shaft 19, one end of which extends beneath the lathe bed 1 and has a wheel 20 fixed thereto. The shaft 19 is journaled in suitable antifriction bearings 21 provided therefor in the rock arm 17 and is provided at its other end with an eccentrically disposed pin 22 that seats in a hole provided therefor in the lower end of a link 23 whose upper end is pivotally connected, as at 24, to a hollow cylindrical sleeve or cap 25 sleeved on a reduced upper end portion 8a of the pump piston 8. The cylindrical cap 25 is held on the piston 8 by nuts 26 threaded on the upper end thereof; and a helical compression spring 27 is sleeved on the reduced upper end portion 8a of said piston between the upper end of said cap and a shoulder 8b formed by said reduced portion of said piston.

The wheel 20 fixed to the shaft 19 journaled in the free end of the rock arm 17 is pressed against the underside of the bed 2 of the lathe, preferably by means of a helical compression spring 28, mounted in a bore 29 provided therefor in said arm between the ends thereof. The spring 28 rests on a lug 30 provided therefor on the adjacent wall of the oil tank 6; and a threaded plug 31 closes the upper end of said bore and rests upon the upper end of said spring.

By the arrangement described, the wheel 20 travels with the carriage 3 and is rotated by means of the friction between the wheel and underside of the bed. Turning of the friction wheel rotates its supporting shaft 19 in the arm 17 and thus causes the eccentric pin 22 to revolve about the shaft axis and impart a reciprocating movement to the pump piston 8 through the link 23 and cap 25 and thus force the oil through the fitting 12, pipes 13 and the passageways 14 to the ways 2 for the carriage 3 and the ways 5 for the cross-slide 4. The coil spring 27 between the piston and the cap therefor is adapted to yield after the pump has built up sufficient pressure to supply the proper amount of oil to the ways, thereby preventing further reciprocation of the pump piston until the pressure falls below that required to compress said spring. This spring also permits continuous rotation of the friction wheel 20 in the idle position of the piston and thus prevents flat spots from being worn on the peripheral surface of said wheel.

Obviously, the hereinbefore described construction admits of considerable modification without departing from the invention. Therefore, I do not wish to be limited to the precise arrangement shown and described.

What I claim is:

1. In a machine tool, the combination of a bed having a way, a carriage movable along said way, and means operated by the movement of said carriage along said way for lubricating the latter, said means comprising a pump mounted on said carriage and adapted to supply oil to said way, a wheel rotatably sustained by and movable with said carriage with its periphery in rolling contact with said bed, and a yieldable connection between said wheel and said pump for actuating the latter, whereby locking of said wheel against rotation is prevented when the pump pressure has built up to a point preventing operation of the pump.

2. In a machine tool, the combination of a bed having a way, a carriage movable along said way, and means operated by the movement of said carriage along said way for lubricating the latter, said means comprising a pump mounted on said carriage and adapted to supply oil to said way, a wheel rotatably sustained by said carriage with its periphery in rolling contact with said bed, and a connection between said wheel and said pump for continuously operating the latter throughout the entire range of movement of said member up to a predetermined lubricant pressure, said connection permitting rotation of said wheel when the pump pressure has built up to a point preventing operation of the pump.

3. In a machine tool, the combination of a bed having a way, a carriage movable along said way, said carriage being provided with a way, a cross-slide movable along said last mentioned way, and means operated by the movement of said carriage for lubricating the ways along which the carriage and cross-slide move, respectively, said means comprising a pump mounted on said carriage in position to supply oil to the respective ways, a wheel rotatably sustained by said carriage with its periphery in rolling contact with said bed, and a yieldable connection between said wheel and said pump for actuating the latter whereby locking of said wheel against rotation is prevented when the pump pressure has built up to a point preventing operation of the pump.

4. In a machine tool, the combination of a bed having a way, a carriage movable along said way, and means operated by the movement of said carriage along said way for lubricating the latter, said means comprising an oil tank fixed to said carriage, a reciprocating pump mounted in said tank with its inlet in communication with said tank and with its outlet leading to said way, a wheel rotatably sustained by said carriage with its periphery in frictional contact with said bed, and a yieldable connection between said wheel and said pump for actuating the latter whereby locking of said wheel against rotation is prevented when the pump pressure has built up to a point preventing operation of the pump.

5. In a machine tool, the combination of a bed having a way, a carriage movable along said way, and means operated by the movement of said carriage along said way for lubricating the latter, said means comprising an oil tank fixed to said carriage, a reciprocating pump mounted in said tank with its inlet in communication with said tank and with its outlet leading to said way, a wheel rotatably sustained by said carriage with its periphery in frictional contact with said bed, and a connection between said wheel and said pump for continuously actuating the latter throughout the entire range of movement of said member up to a predetermined lubricant pressure, said connection permitting rotation of said wheel when the pump pressure has built up to a point preventing operation of the pump.

6. The combination of a support having a way, a member movable along said way, and means operated by the movement of said member along said way for lubricating the latter, said means comprising a pump mounted on said member in position to supply oil to said way, said pump including a reciprocating piston, an arm movable with said member, a shaft rotatably supported by said arm, a wheel fixed to said shaft with its peripheral surface in rolling contact with the underside of said supporting member, an eccentric pin on said shaft, a member mounted on said piston, and a link connection between said member and said eccentric pin.

7. The combination of a support having a way, a member movable along said way, and means operated by the movement of said member along said way for lubricating the latter, said means comprising a pump mounted on said member in position to supply oil to said way, said pump including a reciprocating piston, a spring supported arm pivoted to and movable with said member, a shaft journaled on the free end of said arm, a wheel fixed to said shaft and frictionally engaging the underside of said supporting member, an eccentric pin on said shaft, a cap sleeved on said piston, nuts threaded on said piston for holding said cap thereon, a link connection between said cap and said eccentric pin, and a coil spring sleeved on said piston between said cap and a shoulder on said piston.

8. The combination of a bed having a way, a carriage movable along said way, and means operated by the movement of said carriage along said way for lubricating the latter, said means comprising an oil tank fixed to said carriage, a pump mounted on said tank with its inlet in communication therewith and with its outlet leading to said way, said pump including a reciprocating piston, an arm pivoted to and movable with said carriage, a shaft journaled in the free end of said arm, a wheel fixed to said shaft and frictionally engaging the underside of said bed, an eccentric pin on said shaft, a cap sleeved on said piston, nuts on said piston in abutting relation to the outer end of said cap, a link connection between said cap and said eccentric pin, and a coil spring interposed between the outer end of said cap and a shoulder on said piston.

LIONEL A. CARTER.